Jan. 4, 1938.  M. M. GUGGENHEIM  2,104,558
COOLING DRUM
Filed Jan. 20, 1936

INVENTOR
MAX MARC GUGGENHEIM
BY
George B. Willcox
ATTORNEY

Patented Jan. 4, 1938

2,104,558

UNITED STATES PATENT OFFICE 2,104,558

COOLING DRUM

Max Marc Guggenheim, Saginaw, Mich., assignor to Baker Perkins Company, Inc., Saginaw, Mich., a corporation of New York Application January 20, 1936, Serial No. 59,894

5 Claims. (Cl. 257—95)

This invention relates to apparatus for cooling and solidifying liquid, semi-liquid, or plastic materials or mixtures, such as molten confectionery, and pertains particularly to machines in which the material to be cooled is deposited upon the periphery of a cooled rotating drum, from which the solidified material is subsequently removed by scraping.

Specifically, the invention pertains to an improved system for distributing and circulating cooling medium over the inner surface of the drum wall, and withdrawing the spent cooling medium from the drum. It has for its object the provision of an inexpensive and effective system of pipes and ducts for distributing the cooling medium evenly over the inner surface of the drum, together with means for directing and controlling the flow of the medium, and pipes and ducts for collecting and withdrawing from the drum the warmed cooling medium, whereby all parts of the drum surface will be uniformly cooled to the proper temperature for the material being treated.

In attaining this object I provide a rotatably mounted cooling drum having a hollow rim, a plurality of transverse apertured distributing pipes spaced apart circumferentially of the drum within the hollow rim, and a plurality of similar collector pipes spaced alternately between the distributing pipes. Radial ducts lead from the hubs of the drum to said distributing and collector ducts for supplying a cooling medium, such as water, to the hollow rim and for conducting it therefrom. The transverse distributing and collecting pipes are provided throughout their length with a plurality of orifices spaced appropriately across the drum surface to provide for a flow of cooling medium which will cool the drum uniformly from edge to edge. With the distributing and collector pipes spaced at close intervals peripherally of the drum, it is possible to maintain exceedingly uniform temperatures at all points on the drum surface.

Other features of the invention will be disclosed in the course of the following specification.

In the accompanying drawing, forming a part hereof, Fig. 1 is a fragmentary perspective view of a cooling drum embodying the invention.

Figure 1:
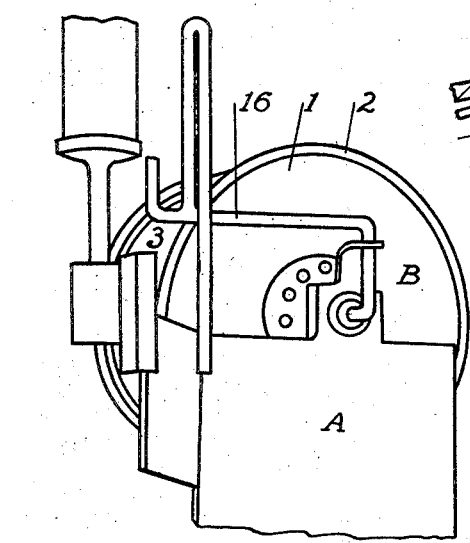
Figure 3:
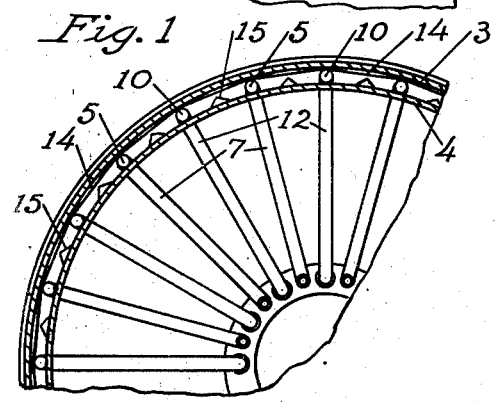
Fig. 3 is a fragmentary sectional view, taken radially through the cooling drum along line 3—3 of Fig. 2, showing diagrammatically the ducts leading to and from the distributing and collector pipes on the hollow rim.
Figure 5:
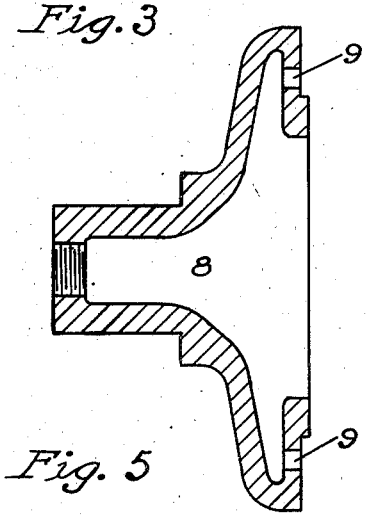
Fig. 5 is an axial section through one of the hub fittings through which cooling medium is supplied to and received from the ducts to the distributing and collector pipes.
Figure 4:
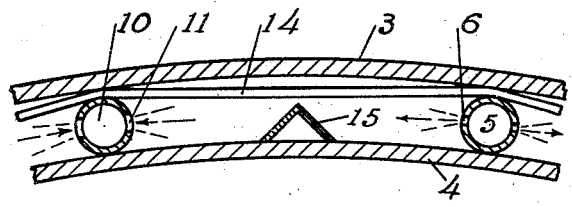
Fig. 4 is an enlarged section through the hollow rim shown in Fig. 3, showing in detail the distributing and collector pipes and the baffles of the improved cooling system.
Figure 7:
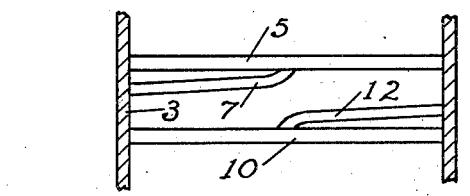
Fig. 7 is a tangential section through the rim of the drum, showing the relative positions of adjacent distributing and collector pipes, and their associated supply and outlet ducts.
Figure 2:
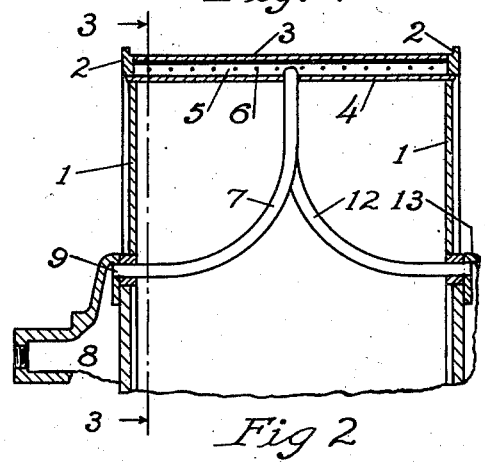
Fig. 2 is a fragmentary vertical section through the drum of Fig. 1, taken along its axis.
Figure 6:
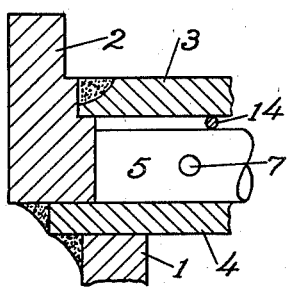
Fig. 6 is an enlarged vertical section through the left-hand edge of the drum in Fig. 3, showing the assembly of the walls of the hollow rim and the distributing pipes therein.

Referring to Fig. 1 a machine incorporating the invention comprises a frame A, upon which is rotatably mounted a cooling drum B. Referring to Figs. 1 through 4, 6, and 7, drum B comprises a pair of circular end plates 1 provided with peripheral rims 2, between which is mounted a cylindrical outer wall 3, the outer face of which constitutes the cooling surface. Spaced inwardly from drum 3 and concentric therewith is an inner wall 4, which, with wall 3, defines a cylindrical hollow rim.

Within the hollow rim are located a plurality of parallel transverse distributing pipes 5, each of which is provided along opposite sides with orifices or jets 6 for the passage of cooling medium from the pipes into the hollow rim circumferentially thereof. Radial distributing ducts 7 extend from the hub of the drum assembly to each of the pipes 5 intermediate its ends for the purpose of supplying fluid cooling medium thereto. At their inner ends, ducts 7 pass outwardly through a side plate of the drum (at the left in Fig. 2), communicating with the interior of a hollow hub 8 through ports 9. Through a suitable stuffing box (not shown) in the outer end of the hub, cooling medium is supplied thereto, flowing thence through ports 9 into ducts 7 and distributing pipes 5, which are spaced at equal intervals circumferentially of the hollow drum.

Midway between each pair of pipes is located a collector pipe 10 provided with orifices 11, preferably somewhat larger than the orifices 6 in pipes 5 for permitting spent cooling medium to flow into pipes 10 with a minimum of back pressure. At the middle of each collector pipe 10 a return duct 12 similar to supply duct 7 is connected, leading to the opposite side of the drum assembly. Here a second hollow hub 13 identical with hub 8 is provided to receive the spent cooling medium conducted from the hollow rim by ducts 12.

To insure uniform cooling of the drum surface 3, pipes 5 and 10 are spaced therefrom by wire rods 14 which extend circumferentially of drum 3. By preventing contact of pipes 5 and 10 with the surface of the wall 3 of the drum localized cold spots are avoided. The rods 14 also hold the pipes 5 and 10 to the inner wall 4 and assist in keeping them in place.

Further, to insure an even flow of cooling medium over the inner surface of wall 3 there may be provided, between the distributing pipes 5 and collector pipes 10, transverse flow-retarding baffles 15, secured to the face of the inner wall 4 of the hollow rim. Baffles 15 extend the width of the drum surface, and partially close the passage between each pair of adjacent pipes 5 and 10. These baffles, by breaking the force of cooling medium from jets 6 in pipes 5, tend to retard its flow somewhat, and spread it uniformly over the inner face of the drum wall 3. They also cause more or less turbulence which improves the heat-absorption of the cooling fluid. Thus from one pipe 5 to its adjacent collector pipe 10 the cooling of the surface 3 will be substantially uniform.

The cooling medium may be any desired fluid suited for the purpose, and may be supplied from refrigerating or temperature controlling apparatus appropriate to the temperature at the drum surface required for treating a given material. It is supplied to hub 8 through pipe 16 (Fig. 1), and the spent fluid is withdrawn from the opposite hub by a similar connection (not shown).

While I have shown and described certain novel features of my invention, it will be understood that various omissions, substitutions, and changes in the details of the device illustrated and in its operation may be made without departing from the spirit of the invention.

Having thus described my invention, what I claim and desire to secure by Letters Patent is:

1. In a cooling drum for molten material comprising a cylindrical hollow rim, in combination, a plurality of distributing pipes within said hollow rim extending transversely from side to side thereof and spaced apart circumferentially of said rim, outlet orifices in the walls of said pipes to direct cooling medium circumferentially of said rim, a plurality of transverse collector pipes in said rim positioned alternately between said distributing pipes, orifices in the walls of said pipes to receive fluid discharged from the adjacent outlet pipes, means for supplying cooling medium to said distributing pipes, and means for withdrawing spent cooling medium from said collector pipes.

2. A structure as claimed in claim 1, wherein transverse baffles are provided between adjacent distributing and collector pipes, said baffles being arranged to spread the flow of cooling water in the hollow rim over the inner face of the material cooling wall of the drum.

3. A structure as claimed in claim 1 wherein outlet orifices are provided along two side walls of each distributing pipe to direct cooling medium tangentially of said hollow rim, and orifices are provided along two sides of each collector pipe to receive fluid discharged from the adjacent distributing pipes, and transverse baffles are provided between the adjacent distributing and collector pipes to retard and spread the flow of cooling medium over the inner surface of the drum.

4. A rotatable cooling drum comprising in combination an outer cylindrical shell, an inner cylindrical shell spaced from the inner wall of said outer shell to define therewith a hollow cylindrical rim, a plurality of distributing pipes within said rim spaced apart circumferentially of said rim and extending from side to side thereof, outlet orifices spaced along the walls of said pipes, a plurality of collector pipes within said hollow rim positioned alternately between said distributing pipes and parallel thereto, inlet orifices spaced along the walls of said collector pipes, a plurality of supply ducts connected individually to each of said distributing pipes, a hollow hub at one side of the drum communicating with all of said supply ducts and connected through a gland with a source of cooling medium, a plurality of outlet ducts connected individually to each of said collector pipes, and a second hollow hub at the side of the drum opposite said first hub, communicating with all of said outlet ducts and provided with an outlet for the spent cooling medium.

5. In a cooling drum for molten material comprising a cylindrical hollow rim, in combination, a plurality of distributing pipes within said hollow rim and extending from side to side thereof and spaced apart circumferentially of said rim, and outlet orifices disposed lengthwise of said pipes, a plurality of collector pipes positioned alternately between said distributing pipes and having inlet orifices disposed throughout their length, means for supplying cooling medium to said distributing pipes, and means for withdrawing spent cooling medium from said collector pipes, the outer walls of the said distributing and collector pipes being spaced apart from the inner face of the material cooling surface of the drum whereby localized cooling of the drum surface is avoided, and rods are provided extending circumferentially of the drum and between the outer walls of said distributing and collector pipes and the inner surface of the material cooling wall of the drum.

MAX MARC GUGGENHEIM.